Jan. 7, 1941.  C. A. HOLMAN  2,227,647
HYDRAULIC POWER TRANSMISSION MECHANISM
Filed June 27, 1938   3 Sheets-Sheet 2
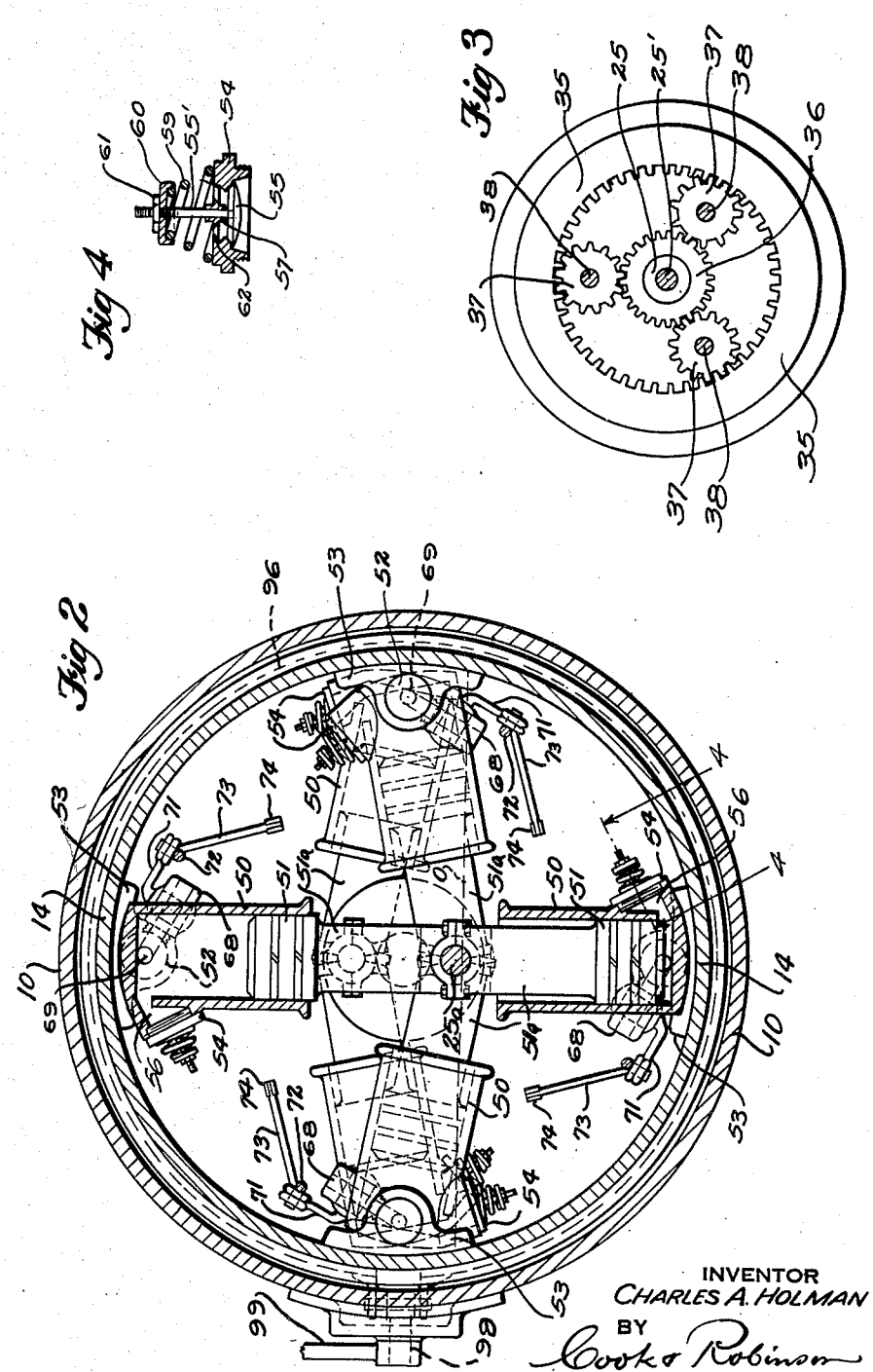
INVENTOR
CHARLES A. HOLMAN
BY
Cook & Robinson
ATTORNEY Jan. 7, 1941.  C. A. HOLMAN  2,227,647
HYDRAULIC POWER TRANSMISSION MECHANISM
Filed June 27, 1938  3 Sheets-Sheet 3
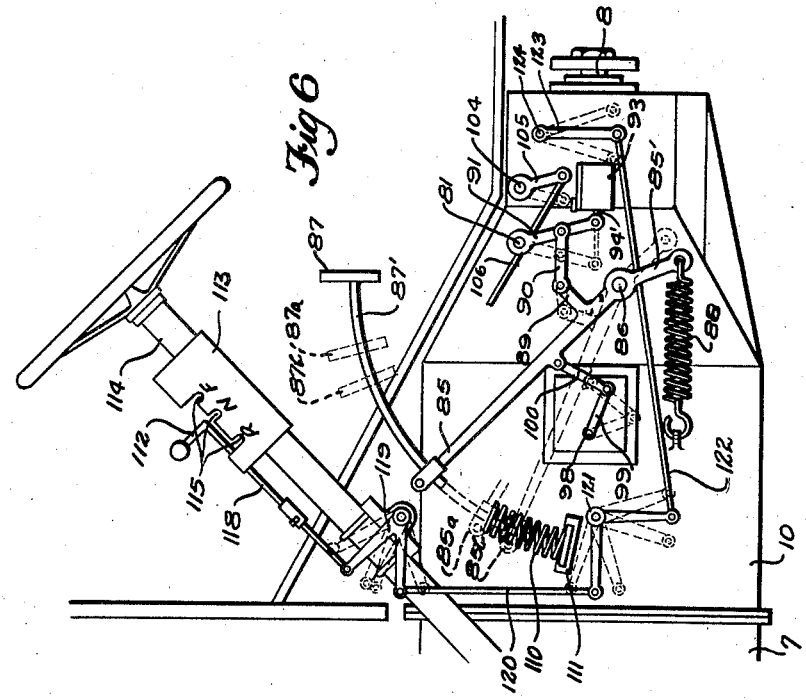
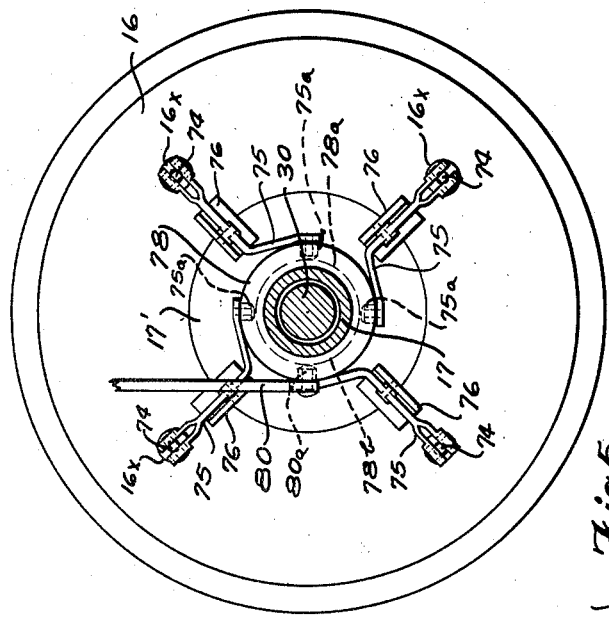
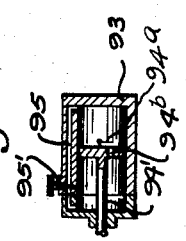
INVENTOR
CHARLES A. HOLMAN
BY
Cook & Robinson
ATTORNEY Patented Jan. 7, 1941

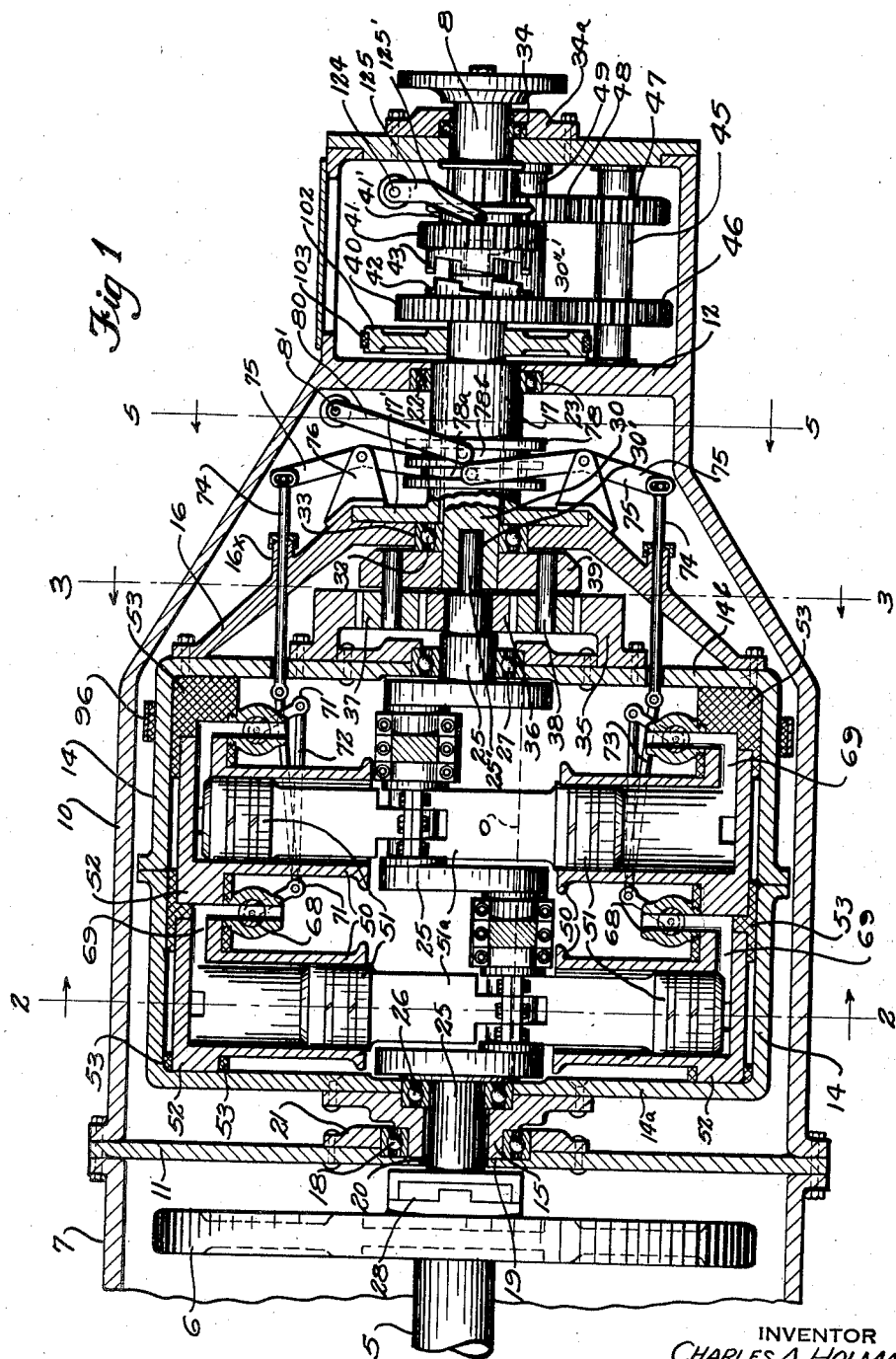

2,227,647

UNITED STATES PATENT OFFICE 2,227,647

HYDRAULIC POWER TRANSMISSION MECHANISM

Charles A. Holman, Seattle, Wash.

Application June 27, 1938, Serial No. 215,978

11 Claims. (Cl. 74—293)

This invention relates to power transmission units, and it has reference more particularly to a mechanism for the delivery of power from the drive shaft of a prime mover, or engine, to a driven shaft in a manner whereby to obtain any one of an infinite number of driving speeds for the latter shaft ranging progressively from the maximum high speed to the minimum low speed.

It is the principal object of this invention to provide a variable speed power transmission unit of the character above stated, wherein a drive shaft is connected to a driven shaft through the mediacy of a planetary gear system and a manual clutch whereby the speed of the driven shaft may be varied to any extent between zero and that corresponding to the drive shaft, and wherein the power applied through the driven shaft increases proportionately with reduction in speed, up to the maximum.

It is also an object of the present invention to provide a power transmission unit of the above stated character that is especially adapted for use in connection with the power plant or engine of an automobile, bus, truck, tractor, stationary engine, or the like, wherein the transmission of power from the drive shaft of the engine, or source of energy, to the driven shaft for driving the vehicle is through the mediacy of a hydraulic medium, confined in the system for circulation under the action of pump pistons, and so controlled in its circulation that the power delivered to the driven shaft, through the mediacy of the hydraulic medium and the pistons, may be varied and maintained at any desired ratio, or degree, with reference to the power supplied by the drive shaft.

Explanatory to the present invention, it will here be stated that the conventional types of shiftable gear transmission units now generally in use in automobiles, as well as some types of hydraulic transmissions, provide only for a limited choice of predetermined gear ratios; i. e., they make possible three or four different forward speeds and usually one speed in reverse drive.

The present transmission unit differs from the above conventional types in that it makes possible an infinite number of speeds, in either forward or reverse directions, ranging from the maximum "high speed" to the minimum "low speed."

More specifically stated, the objects of the present invention reside in the provision of a transmission unit of the character above stated wherein the power connection provided between the drive shaft of the prime mover and the driven shaft of the vehicle to be moved, is effected primarily through the planetary gear system in combination with the hydraulic clutch system, wherein the outer ring gear of the planetary system is mounted coaxially on the revoluble hydraulic drum which houses a revoluble, driven crankshaft coaxially therein, which has the central gear of the planetary system mounted upon the extending end thereof, and the intermediate gears of the planetary gear rotatably mounted upon a disk fixed coaxially to the driven shaft, thus causing the drum to be rotated by the planetary system which will operate the hydraulic pumping means therein, the exhaust valves of which may be manually controlled in such manner as to cause the crank shaft and drum to rotate in unison for a direct drive of the driven shaft or to permit a difference in relative speeds of rotation of the drum relative to the crank shaft to effect a slower turning of the driven shaft with a corresponding increase of power, through the action of the planetary gear system.

It is a further object of this invention to provide a transmission unit wherein the speed of the driven shaft may be varied through the control of the prime mover, for example, by the delivery of more or less fuel thereto, as well as through the manual control of the direction and speed of rotation of the planetary ring gear through the hydraulic mechanism, thereby providing a dual control that makes possible the operation of a vehicle or machine at a definite speed under varying load conditions without change in the hydraulic control devices.

It is a further object of this invention to provide a power transmission unit that is efficient, durable and strong and consequently of long life; furthermore, a unit wherein the mechanical details are of such design as to facilitate construction, assembly or disassembly.

The present mechanism is designed as a power transmitting connection between the end of a drive shaft of an engine and the driven shaft whereby power is transmitted to some mechanism or vehicle. In the present instance, the transmission mechanism is described and illustrated in its application to the usual type of automobile which, in most instances, would have an internal combustion engine as its prime mover. However, it is not intended that this description shall be construed as limiting the transmission unit to this use, but that the description shall be considered only as applying to one of various applications to which the unit might be put, without in any way departing from the spirit of the invention.

In accomplishing these and other objects of the invention, I have provided the improved details of construction, the preferred forms of which are illustrated in the accompanying drawings, wherein—

Fig. 1 is a longitudinal section of a power transmission mechanism embodying the present invention.

Fig. 2 is a cross section of the same, as seen on the line 2—2 in Fig. 1.

Fig. 3 is a cross section on the line 3—3 in Fig. 1, showing the planetary gear system.

Fig. 4 is a cross section of the intake valve of the hydraulic cylinder, of the pumping system, as seen on the line 4—4 in Fig. 2.

Fig. 5 is a sectional view on the line 5—5 in Fig. 1, showing a clutch actuating and valve control mechanism.

Fig. 6 is a side elevation of the present transmission unit associated with certain parts of an automobile.

Fig. 7 is a cross sectional view of the foot lever retarding mechanism used with the control means.

Referring more in detail to the drawings—

In Fig. 1, the reference numeral 5 designates what may be the rearward end portion of the drive shaft of a vehicle engine, and 6 is a flywheel mounted thereon in the usual manner; these parts being contained within the engine housing, a part of which is designated by reference numeral 7. The shaft that is to be driven, or what, for convenience, will be referred to as the power transmission or driven shaft, is designated by numeral 8, and it is operatively connected through the mediacy of the present transmission unit to the engine shaft. The transmission unit, or mechanism embodied by this invention, as will be observed by reference to Fig. 1, is contained within a housing 10 which, in effect, is a continuation of the engine housing 7.

One end of the housing 10, that being the end referred to as the forward end, is closed by a wall or partition plate 11 securely bolted between the flanged ends of the housings 7 and 10. In the opposite end portion of the housing 10 there is a vertical partition wall 12 that separates the forward compartment, which houses the transmission unit proper, from a smaller rear compartment which houses the reversing gears. This separation of compartments is in order that the reversing gears might be confined in an oil bath which is not required for the other parts rotating in the larger compartment.

Supported rotatably in the housing 10 and coaxial of the axial line of the drive shaft 5 is a cylindrical drum 14, preferably made in two complemental opposite end sections, joined together in a medial plane between the opposite ends of the drum. The drum is closed at its opposite ends respectively by the walls 14a and 14b, and it is rotatably supported at its forward end by a trunnion 15 that is flanged and securely bolted therethrough to the end wall 14a, and at its rearward end is likewise supported through the mediacy of a conically tapered casting 16, and a tubular extension 17 operating as a trunnion; the casting 16 being flanged at its larger end and bolted through the flange to the end wall 14b of the drum, and the tubular extension 17 being formed with an end flange 17' that is securely clamped to the outer or smaller end of the casting 16. By reference to Fig. 1, it will be observed that the drum 14 and its opposite end supports are in the same axial line, and that this line is coaxial of that of the drive shaft 5 and driven shaft 8.

To rotatably mount the drum in the housing 10, the trunnion 15 is rotatably mounted in suitable anti-friction bearings 18 set within a socket 19 about an opening 20 in the partition wall plate 11, and supplemented for support by an encircling plate 21 bolted to the wall. The tubular, supporting extension 17 for the rear end of the drum is likewise rotatably contained in anti-friction bearings designated at 22, set within a socket 23 about an opening through the partition wall 12. The rear end of the extension, or sleeve 17, is flush with the rear face of the wall 12, as will be observed by reference to Fig. 1.

Rotatably mounted in the drum 14, coaxial thereof, is a crank shaft 25, supported at its opposite ends, respectively, in ball bearings 26 and 27 mounted in openings provided therefor in the end walls 14a and 14b of the drum. At its forward end, the crank shaft has a fixed driving connection as designated at 28 with the rear end of drive shaft 5 to rotate in unison therewith, and at its rear end it has a portion of reduced diameter 25' that freely rotates within the end socket 30' of a short extension, or idler shaft 30 that is coaxial of and contained rotatably within the tubular drum supporting extension 17. It will be seen in Fig. 1 that this short idler shaft 30 is rotatably contained, at that end which is adjacent the drum, in ball bearings 32, fitted in a socket 33 in the outer end wall of casting 16, and that its rearward end extends beyond the rear end of the part 17 and, within the reverse gear compartment, is equipped, as will presently be described, for driving the shaft 8 either in a forward or reverse direction, depending upon the setting of the reversing gears.

The rear end of the idler shaft 30 has a portion of reduced diameter 30'' that is rotatably fitted in an axial bore in the shaft 8. The shaft 8 extends though an opening in the rear end wall of the housing 10 and is rotatably mounted in anti-friction ball bearings 34 mounted on the housing wall by a housing plate 34a.

Driving connection between the shaft 30 and shaft 8 is provided for as follows: Fixed on the idler shaft 30 is a gear wheel 40, and slidably keyed on shaft 8 is a gear wheel 41, the hub portions of these two gears are formed with clutch jaws, designated respectively at 42 and 43, adapted to be engaged or disengaged by the shifting of gear 41. When the clutch jaws are engaged, a forward driving connection is provided.

Rotatably mounted in the housing 10, below the clutch gears, is a shaft 45 parallel to the shaft 8, which has two gear wheels 46 and 47 fixed thereon; the gear 46 being in constant mesh with the gear wheel 40 and the gear 47 being in constant mesh with a gear 48 on a shaft 49 revolubly supported in the housing parallel with shaft 45.

The gear 41 may be shifted to a neutral position, as seen in Fig. 1, or into mesh with the gear 48, thereby to effect a reverse driving direction for shaft 8. The means for shifting the gear 41 along the shaft 8 will be described later in connection with the description of the control mechanism.

Fixed to the outer face of the end wall 14b of the drum 14, and coaxial of the drum and adjacent end of the crank shaft, is an internal ring gear 35; this gear being the outer gear of the planetary gear system previously mentioned. Fixed on the crank shaft 25 in the plane of the ring gear, is a pinion gear 36 which is the center gear of the planetary system, and operable in mesh with the pinion gear and with the ring gear are three planet, or intermediate gears, 37, mounted on stub axles 38 fixed in a disk or wheel 39 that is keyed on the adjacent end of the idler shaft 30; the relationship of the gears of the planetary system being shown best in Fig. 3. Thus, the driving of the shaft 30 is through the planetary gear system and its speed of rotation, with reference to the speed of the shaft 5 is dependent upon the rotation of the drum 14 relative to the crank shaft. If the crank shaft and drum turn in unison in the same direction, then there is a direct drive between the shafts 5 and 30, but if there should be a difference in speed or direction of rotation of the drum relative to the crank shaft, the drum turning at a slower speed, or in the opposite direction, than the driven crank shaft, then the speed of the shaft 30 would be reduced accordingly. The driving connection between the drum and crank shaft comprises the hydraulic pumping mechanism and control valve for circulation of the hydraulic medium. This will now be described:

Mounted within the drum substantially radial thereof, as will best be understood by reference to Figs. 1 and 2, are a plurality of pump cylinders 50, each containing a pump piston 51 reciprocally therein. At their outer ends, the cylinders have supporting trunnions 52 integral thereof and whereby the cylinders are supported by mounting blocks 53 fixed to the drum wall to permit them to oscillate, through a limited arc, in planes perpendicular to the crank shaft axis. These pump cylinders are arranged in pairs with those of the same pair located at diametrically opposite sides of the drum axis and the alinement of the pairs of cylinders used is at right angles to each other, as noted in Fig. 2; there being eight pump cylinders in all in this unit.

The pistons 51 of the several pump cylinders are connected by their rods 51a with the throws 25a of the crank shaft 25 whereby to effect their reciprocal action.

As was previously stated, the driving of the transmission shaft through this mechanism is through the mediacy of a hydraulic medium and a controlled circulation thereof through the pumping cylinders. The hydraulic medium is contained in the drum 14 and its normal level O, with the drum at rest, would be as indicated in Figs. 1 and 2.

Each cylinder is provided at its outer end with an automatic back check intake valve, as shown in section in Fig. 4, comprising a valve seat 54 that is threaded into a lateral opening 56 in the cylinder wall, and a valve head 55 adapted to the seat and provided with a valve stem 55' extending through a bearing 57 located centrally of and supported by the valve seat. A spring 59 is mounted between the seat 54 and a retaining washer 60 threaded upon the outer end of the valve stem 55' and held by a lock nut 61, so as to normally hold the valve yieldably in its closed position. Ports 62 in the head permit an easy intaking of liquid therethrough by reason of suction created in the cylinder when the piston operates inwardly. The valve closes automatically to check any outflow through this valve when the piston starts to move outwardly in the cylinder.

Each cylinder has a discharge valve 68 and these are mounted on the bearing blocks 53. Communication between the valves and their respective cylinders is through connecting channels 69, leading laterally from the outer ends of the cylinders, coaxial of one of the cylinder supporting trunnions 52 and to the valve housing passage opening to the inside of the drum. These discharge valves are of the revolving core type and each has a core rotating arm or lever 71 whereby to rotate the core to open or close the passageway from the cylinder. It will also be noted that the levers of valves of the cylinders that are alined in the axial direction of the drum are connected together in pairs by links 72, so that they may be operated between open and closed positions simultaneously. Also, the valves of each set thus connected are adapted to be adjusted through a link 73 connected at one end to one of the valve levers 71 and at its other end to a push rod 74.

In the present instance, the relief valves are operated in unison by means of the four push rods 74. These rods extend slidably through openings in the end wall 14b of the drum 14 and through supporting bearings 16x in the walls of the conical casting 16, and are equally spaced about the axis of the drum and are parallel to the drum axis.

Each push rod 74 is operatively connected at its outer end to an actuating lever 75, and the several levers are pivotally mounted by brackets 76 fixed to the end of casting 16. All the relief valves are controlled through the adjustments of a collar 78 that is slidable along the cylindrical support 17 and which is provided with an encircling channel or groove 78a into which studs 75a fixed in the inner ends of levers 75 extend. The collar also has an encircling channel 78b into which a stud 80a on the end of a collar shift lever 80 extends. The lever 80 is fixedly mounted upon a cross shaft 81 that is supported by the housing 10 with one end extended to the outside thereof, and which, at its outer end, is connected with an actuating pedal as will now be explained.

As seen in Fig. 6, illustrating the adaptation of this hydraulic transmission unit to an automobile of conventional type, there is a lever 85 located at the side of the housing 10 and pivotally mounted thereon by the pivot designated at 86. The upper end of this lever is equipped with a foot pedal 87 supported by an arcuate rod 87', and this pedal is adapted to be manually depressed for the actuation of the lever to three elementary positions in use; namely, "neutral," "low gear" and "high gear" positions. The neutral position of the lever is shown in dotted lines at 87a, the "low gear" or "reverse" is also shown in dotted lines, at 87b, and the "high gear" position is shown in full lines at 87. A coiled spring 88 is connected to a portion 85' of the lever 85 extending beyond the pivot 86 so as to normally hold the lever yieldingly in its upper position. An arm 89 extending laterally and upwardly from the lever 85 just above the pivot 86 is connected pivotally at its ends by a link 90 to a lever arm 91 that is fixed upon the outer end of the shaft 81 so as to provide for a rotative movement of the shaft 81 upon movement of lever 85, thereby to shift the collar 78 on bearing 17 for an actuation of the several valves controlling discharge from the hydraulic cylinders.

When the foot pedal is depressed to actuate the lever 85 to its neutral position as indicated in dotted lines at 85a, it engages against the upper end of a coiled spring 110 which is supported at its lower end in a seat 111 fixed to the housing 10. Depression of the pedal beyond its neutral position to the low gear or reverse position, as indicated at 85b, compresses the spring 110.

Since there are certain times or instances when it is desirable to hold the drum 14 against rotation in its housing, I have fitted a brake band 96 thereto as shown in Figs. 1 and 2, the ends of which are adapted to be drawn together to tighten the band about the drum by the conventional connection with the inner end of a rotatably mounted shaft 98 extending through the side wall of housing 10, as seen in Fig. 2, and equipped at its outer end with an actuating lever arm 99 which is pivotally connected at its end with a link 100 which, in turn, connects to lever 85. The connection is such that depression of pedal 87 beyond "neutral" to "low" will tighten the band about the drum.

In order to retard the return of the foot pedal from "low" or "neutral" to "high," thus placing the driving connections under detrimental strain, I have provided an oil check device comprising a closed cylinder 93 fixed on housing 10 and containing a piston 94 connected by a rod 94' with the lower end of lever 91. This piston 94 contains a valve member 94a disposed adjacent a port 94b therein, thereby permitting the oil to flow therethrough when the piston moves outward, but closes when the piston moves inward, to cause the oil to be forced through the by-pass channel 95 past a needle valve 95', thus effecting a slow return movement of the pedal 87. Thus, under the return pull of spring 88, on the lever 85, the closing of valves 68 will be retarded.

There is also provided a brake wheel 102 fixed on the end of shaft 30 just beyond the rear end of supporting sleeve 17, and about this wheel a brake band 103 is fitted as a means of slowing down the gears associated therewith, as presently described, for easier shifting to reverse. This brake band is adapted to be tightened by the rotation of a cross shaft 104 mounted in the housing and having the conventional connection with the band ends, and at the outside of the housing, having an actuating lever arm 105 connected by means of a rod 106 with a foot pedal, not herein shown, in a manner whereby the actuation of the lever from its full line position, as seen in Fig. 1, to the dotted line position, applies the brake.

A shifting lever 112 is associated with a supporting plate 113 mounted along the vehicle steering column designated at 114; the plate being notched along its length as at 115 to receive the lever to positively stop it in positions which determine "forward," "neutral," and "reverse" drive positions of the gear wheel 41.

The plate 113 also mounts a shift rod 118 for longitudinal shifting therein. At its upper end the shift rod mounts the lever 112 and at its lower end it is operatively connected with one arm of a bell crank lever 119 pivotally mounted on the steering column. The other arm of the bell crank is pivotally connected by a link 120 which connects with one arm of another bell crank lever 121 which has its remaining arm operatively connected by a link 122 to a lever arm 123 that is fixed to the outer end of a shaft 124 that is mounted by and extends rotatably through the reverse gear housing.

As seen in Fig. 1, this cross shaft 124 has a lever 125 fixed thereto, with a stud 125' at its end extending into a channel 41' that encircles the hub portion of gear 41, so that the shifting of rod 118 by the lever 112 will effect a positioning of the gear 41 corresponding to the "forward," "neutral" or "reverse" position of the lever 112.

With the unit so constructed, and associated with an engine and the driving shaft of an automobile in the manner indicated, its use and mode of operation would be as follows:

Assuming the engine to be at rest, to start operation, the gear shift lever 112 is first moved to "neutral" position, thereby disengaging the clutch jaws 42 and 43 so that there will be no driving connection between the unit and shaft 8. The engine is then started in the usual manner to drive the shaft 5 and its speed is governed in accordance with the admittance of fuel to the engine. With the engine in motion, the crank shaft 25 will be rotating with the shaft 5.

With the engine in motion, the clutch is shifted either to "forward" or "reverse," depending upon the direction it is desired to travel, this shifting being effected through the actuation of lever 112. However, before setting the clutch for either "forward" or "reverse" the foot pedal 87 is depressed to "neutral" position, thus to open all the valves 68 and allow the drum to run free. Then the brake 103 is tightened on drum 102 to stop or retard the rotation of shaft 30 so that there will be no clashing when the clutch is set.

In consideration of the fact that the valves 68 are open, it will be understood that rotation of the crank shaft 25 will cause a reciprocal action of the pistons 50 in their cylinders. Thus, as they travel inwardly, toward the crank shaft, they will operate to draw the hydraulic medium into the cylinders, and on their opposite travel, will discharge it into the drum through the open valves 68. Thus, with the clutch set, and assuming there is some load on the vehicle, it will be understood that the resistance of the shaft 30 to turning will cause a reverse rotation of the drum through the planetary gear system, and the driving force applied through shaft 30 to shaft 8 is approximately equal to that used in rotating the drum and would not ordinarily be sufficient to move the vehicle, especially if its wheel brakes were set.

Now, to start the vehicle in "low," the foot pedal 87 is depressed a farther extent beyond "neutral" or to the "low" position, thereby to cause the brake band 96 to be tightened about the drum, thus first to slow it down to a stop, and then to hold it against rotation. As soon as the drum is stopped, then there is a low speed drive established through the planetary system whereby the vehicle may be set in motion. After it has gained sufficient speed through the acceleration of the vehicle engine, the foot pedal is released and is slowly returned to high speed position by the action of springs 110 and 88.

The initial return movement of the pedal 87 releases the drum brake band 96 from about the drum and the remaining movement causes a gradual closing of the valves 68 to bring about a driving lock between the crank shaft and drum, thus causing direct drive through the planetary gear system with shaft 8.

It will be explained that immediately upon releasing the brake band and before the valves have been closed, there may be a reverse rotation of the drum, but by the farther closing of the valves, the drum will be slowed down to a stop, then caused to rotate in the direction of the crank shaft, and finally brought into unison therewith.

Such a transmission mechanism provides an infinite number of gear ratios between a given "low gear," as regulated by the planetary gear system, and a "high speed" that results from the direct drive connection.

In this arrangement and use, the vehicle speed may be controlled either by the application of fuel to the engine or through the action of the planetary system. In the latter case, speed is reduced with a corresponding increase in power applied to the driven shaft.

By this system, both the speed of the motor and gear ratio are controlled, and maximum efficiency is attained both in power and speed.

The invention should not be limited to the exact details herein illustrated and described, but should be given an interpretation commensurate with the spirit and scope of the invention.

Having thus described my invention, what I claim as new therein and desire to secure by Letters Patent is—

1. A power transmission mechanism comprising a revolubly mounted drum, containing a hydraulic pressure medium, a driven crank shaft revolubly mounted in the drum, coaxial thereof and for rotation relative thereto, a transmission shaft extending from the crank shaft coaxial thereof, a planetary gear system having its central gear fixed on the crank shaft, its outer gear fixed on the drum and its intermediate gears mounted by the transmission shaft, a driving connection between the driven shaft and outer gear comprising a pump having an inlet and an outlet mounted by, and having parts operatively connected to the drum and driven shaft, and operable incident to relative turning of the drum and driven shaft to pump hydraulic medium from the drum through the inlet, and to deliver it back through the outlet into the drum, a valve in the outlet adjustable from open position at which the effect of the driving connection is reduced to a nullity, to closed position, at which the transmission shaft is caused to rotate in unison with the driven shaft, and a braking means adapted to be set to retain the drum against rotation.

2. A power transmission mechanism comprising a revolubly mounted drum containing a hydraulic medium, a driven shaft coaxial of the drum, a transmission shaft extending from the drum, coaxial thereof, a planetary gear system having its central gear fixed on the driven shaft, its outer gear fixed on the drum and its intermediate gears mounted by the transmission shaft as a means through which the latter may be rotated, a driving connection between the driven shaft and outer gear comprising a liquid pumping mechanism operable incident to relative rotation of the driven shaft and drum to effect a forced circulation of the hydraulic medium in a circuit, and a valve in the circuit adjustable to control the flow of the liquid in the circuit as a means of controlling the relative turning of the outer gear and driven shaft, and when closed, to effect a positive lock through the mediacy of liquid in the pumping mechanism whereby the drum will rotate in unison with the crank shaft and a braking device for the drum operable to hold the latter against rotation when the valve is fully open.

3. A power transmission mechanism comprising a revolubly mounted drum containing a hydraulic medium, a driven crank shaft coaxial of the drum, a transmission shaft extending from the crank shaft, coaxial thereof, a planetary gear system having its central gear fixed on the crank shaft, its outer gear fixed on the drum and its intermediate gears mounted by the transmission shaft as a means through which the latter is rotated, and a liquid pumping mechanism comprising pump cylinders operatively fixed to the drum, pistons in the cylinders operatively connected with the crank shaft for actuation incident to relative rotation of the drum and shaft; each cylinder having an inlet for reception of the hydraulic medium from the drum and an outlet to the drum, a valve in the outlet of each cylinder adjustable to control the flow of the liquid in the circuit as a means of determining the relative turning of the drum and crankshaft, and when closed, to provide a positive lock through the mediacy of liquid in the pumping mechanism whereby the drum will be caused to rotate in unison with the crank shaft, and a brake band applied to the drum and adapted to be set for holding it against rotation when the effect of the driving connection has been nullified by moving the valve to open position.

4. A power transmission mechanism comprising a revolubly mounted drum containing a hydraulic medium, a driven crank shaft coaxial of the drum, a transmission shaft extending from the crank shaft coaxial thereof, a planetary gear system having its central gear fixed on the crank shaft, its outer gear fixed on the drum, and its intermediate gears mounted by the transmission shaft as a means through which it may be driven, pump cylinders contained within and pivotally mounted by the drum, pistons in the cylinders operatively connected to the crank shaft, back check inlet valves for admittance of hydraulic medium into said cylinders, outlet channels for the pump cylinders opening into the drum, control valves for said outlet channels, and manual means operable from outside the drum for adjusting said control valves as a means of regulating the relative turning ratios of the drum and crank shaft for driving the transmission shaft.

5. A power transmission mechanism as recited in claim 4 wherein there is a normally released brake for the drum operatively connected for actuation by the manual means for adjusting the control valves, and whereby the brake may be adjustably applied by a movement of the manual means beyond that for a full opening adjustment of the valves.

6. A power transmission mechanism comprising a revolubly mounted drum containing a supply of hydraulic medium, a driven crank shaft coaxial thereof, a transmission shaft extending coaxial of the crank shaft, a planetary gear system having its central gear fixed on the crank shaft, its outer gear fixed on the drum and its intermediate gears mounted by the transmission shaft as a means through which it may be driven, and a pumping mechanism in the drum comprising pump cylinders and pump pistons operatively fixed on the drum and crank shaft respectively for functional operation incident to relative axial rotation of the drum and crank shaft whereby to force a circulation of the said hydraulic medium through a circuit, valves in the cylinders for the intaking of the hydraulic medium and valves in the circuit adjustable to regulate the outflow of liquid from the cylinders as a means of determining the relative turning of the drum and crank shaft, a manually movable lever for effecting the valve adjustment, a brake for holding the drum, and means operatively connecting the lever and the brake whereby an adjustment of the lever beyond that for a full opening adjustment of the valves will effect an application of the brake to resist rotation of the drum.

7. A transmission mechanism as recited in claim 6 wherein a yieldable means operates to hold the valve adjusting lever normally at a position for full closing of the control valves to effect a positive lock between the pistons and cylinders and a direct drive of the transmission shaft by the crank shaft, and which is yieldable to permit movement of the lever to a neutral position for a full opening adjustment of the valves.

8. A transmission mechanism as recited in claim 6 wherein a yieldable means operates to hold the valve adjusting lever normally at a position for full closing of the control valves to effect a positive lock between the pistons and cylinders and a direct drive of the transmission shaft by the crank shaft, and which is yieldable to permit movement of the lever to a neutral position for a full opening adjustment of the valves, and an additional movement beyond neutral position whereby the braking action on the drum will be effected.

9. A transmission mechanism as recited in claim 6 wherein a yieldable means operates to hold the valve adjusting lever normally at a position for full closing of the control valves to effect a positive lock between the pistons and cylinders and a direct drive of the transmission shaft by the crank shaft, and which is yieldable to permit movement of the lever to a neutral position for a full opening adjustment of the valves, an additional movement beyond neutral position whereby the braking action on the drum will be effected, and a yieldable means acting as a stop for the lever when moved to its neutral position, and which is yieldable to permit an adjustable application of the brake to the drum.

10. A transmission mechanism as recited in claim 6 wherein yieldable means under tension operates to normally retain the adjusting lever at a position for full closing of the valves and to return the lever to this position after actuation, and means is connected with the lever and operable for retarding its return movement after an adjustment of the valves.

11. A transmission mechanism as in claim 6 wherein a braking mechanism is associated with the transmission shaft and wherein means is operable incident to an adjustment of the valve control lever beyond that for fully opening the valves to apply said brake.

CHARLES A. HOLMAN.